United States Patent
Levy et al.

(10) Patent No.: US 9,246,853 B1
(45) Date of Patent: Jan. 26, 2016

(54) SYSTEM, METHOD, AND COMPUTER PROGRAM FOR DETERMINING A PROFILE FOR AN EXTERNAL NETWORK USER

(71) Applicant: Amdocs Software Systems Limited, Dublin (IE)

(72) Inventors: Nir Levy, Tel Aviv (IL); Jackie Assa, Tel Aviv (IL); Nir Pedhazur, Petah Tikva (IL)

(73) Assignee: Amdocs Software Systems Limited, Dublin (IE)

( * ) Notice: Subject to any disclaimer, the term of this patent is extended or adjusted under 35 U.S.C. 154(b) by 344 days.

(21) Appl. No.: 13/747,372

(22) Filed: Jan. 22, 2013

(51) Int. Cl.
*G06F 15/16* (2006.01)
*H04L 12/58* (2006.01)

(52) U.S. Cl.
CPC .................................... *H04L 51/00* (2013.01)

(58) Field of Classification Search
CPC ... G06Q 30/02; G06Q 30/0251; G06Q 10/00; G06Q 99/00; H04L 67/22; H04M 2207/18
USPC .................................... 709/224; 705/14, 319
See application file for complete search history.

(56) References Cited

U.S. PATENT DOCUMENTS

| | | | | |
|---|---|---|---|---|
| 6,480,885 B1* | 11/2002 | Olivier | ......................... | 709/207 |
| 8,180,807 B2* | 5/2012 | Gorti et al. | ..................... | 707/803 |
| 8,583,471 B1* | 11/2013 | Voskuhl et al. | .... | G06Q 30/0254 705/14.53 |
| 2005/0216300 A1* | 9/2005 | Appelman et al. | ..... | G06Q 10/10 705/319 |
| 2006/0073826 A1* | 4/2006 | Miernik | ................ | H04W 48/18 455/435.1 |
| 2006/0252410 A1* | 11/2006 | Bakita et al. | .......... | H04L 43/026 455/411 |
| 2009/0171686 A1* | 7/2009 | Eberstadt | .......................... | 705/1 |
| 2009/0287783 A1* | 11/2009 | Beare et al. | .................... | 709/206 |
| 2009/0319357 A1* | 12/2009 | Flake et al. | ................ | 705/14.25 |
| 2010/0030722 A1* | 2/2010 | Goodson et al. | ........ | G06Q 30/02 706/54 |
| 2010/0132049 A1* | 5/2010 | Vernal et al. | ..................... | 726/27 |
| 2010/0153175 A1* | 6/2010 | Pearson et al. | .................. | 705/10 |
| 2011/0258275 A1* | 10/2011 | Rao | .............................. | 709/206 |
| 2011/0302097 A1* | 12/2011 | Lonkar et al. | ................. | 705/319 |
| 2012/0071131 A1* | 3/2012 | Zisapel et al. | ...... | H04L 63/1425 455/410 |
| 2012/0166348 A1* | 6/2012 | Dyagilev et al. | ............. | 705/319 |
| 2012/0271722 A1* | 10/2012 | Juan et al. | ................. | 705/14.72 |
| 2013/0054480 A1* | 2/2013 | Ross et al. | .................... | 705/319 |
| 2013/0124631 A1* | 5/2013 | Rosansky et al. | ............. | 709/204 |
| 2013/0232012 A1* | 9/2013 | Yan et al. | ............... | G06Q 10/00 705/14.67 |
| 2013/0262483 A1* | 10/2013 | Blom et al. | ....... | G06F 17/30867 707/752 |
| 2013/0325605 A1* | 12/2013 | Callaghan et al. | ......... | 705/14.53 |
| 2014/0032260 A1* | 1/2014 | Grindrod | ..................... | 705/7.29 |
| 2014/0164171 A1* | 6/2014 | Lu et al. | ....................... | 705/26.7 |

OTHER PUBLICATIONS

Pursway, "Identifying Influencers: Our Software," 2012, retrieved from http://www.pursway.com/products-services/identifying-influencers-our-software/.

Jansen, S. M. H, "Customer Segmentation and Customer Profiling for a Mobile Telecommunications Company Based on Usage Behavior," A Vodafone Case Study, Jul. 17, 2007, pp. 1-75.

* cited by examiner

*Primary Examiner* — Anthony Mejia
(74) *Attorney, Agent, or Firm* — Zilka-Kotab, PC (57) ABSTRACT

A system, method, and computer program product are provided for determining a profile for an external network user. In use, a plurality of communications between each of a plurality of home users located in a home network and an external user located in an external network is identified. Additionally, a profile is determined for the external user, utilizing the plurality of communications. Further, one or more actions are performed, utilizing the profile for the external user.

12 Claims, 5 Drawing Sheets

SYSTEM, METHOD, AND COMPUTER PROGRAM FOR DETERMINING A PROFILE FOR AN EXTERNAL NETWORK USER

FIELD OF THE INVENTION

The present invention relates to communication networks, and more particularly to determining a profile for a user of communication networks.

BACKGROUND

The analysis of users of communications networks may result in valuable information for one or more entities. For example, providers of such communications networks may manipulate one or more elements associated with their networks based on results of user analyses. Unfortunately, conventional methods for user analysis have exhibited various limitations.

For example, a current communication network provider may only perform an analysis on users who are currently customers of the specific communication network. There is thus a need for addressing these and/or other issues associated with the prior art.

SUMMARY

A system, method, and computer program product are provided for determining a profile for an external network user. In use, a plurality of communications between each of a plurality of home users located in a home network and an external user located in an external network is identified. Additionally, a profile is determined for the external user, utilizing the plurality of communications. Further, one or more actions are performed, utilizing the profile for the external user.

DETAILED DESCRIPTION

Figure 1:
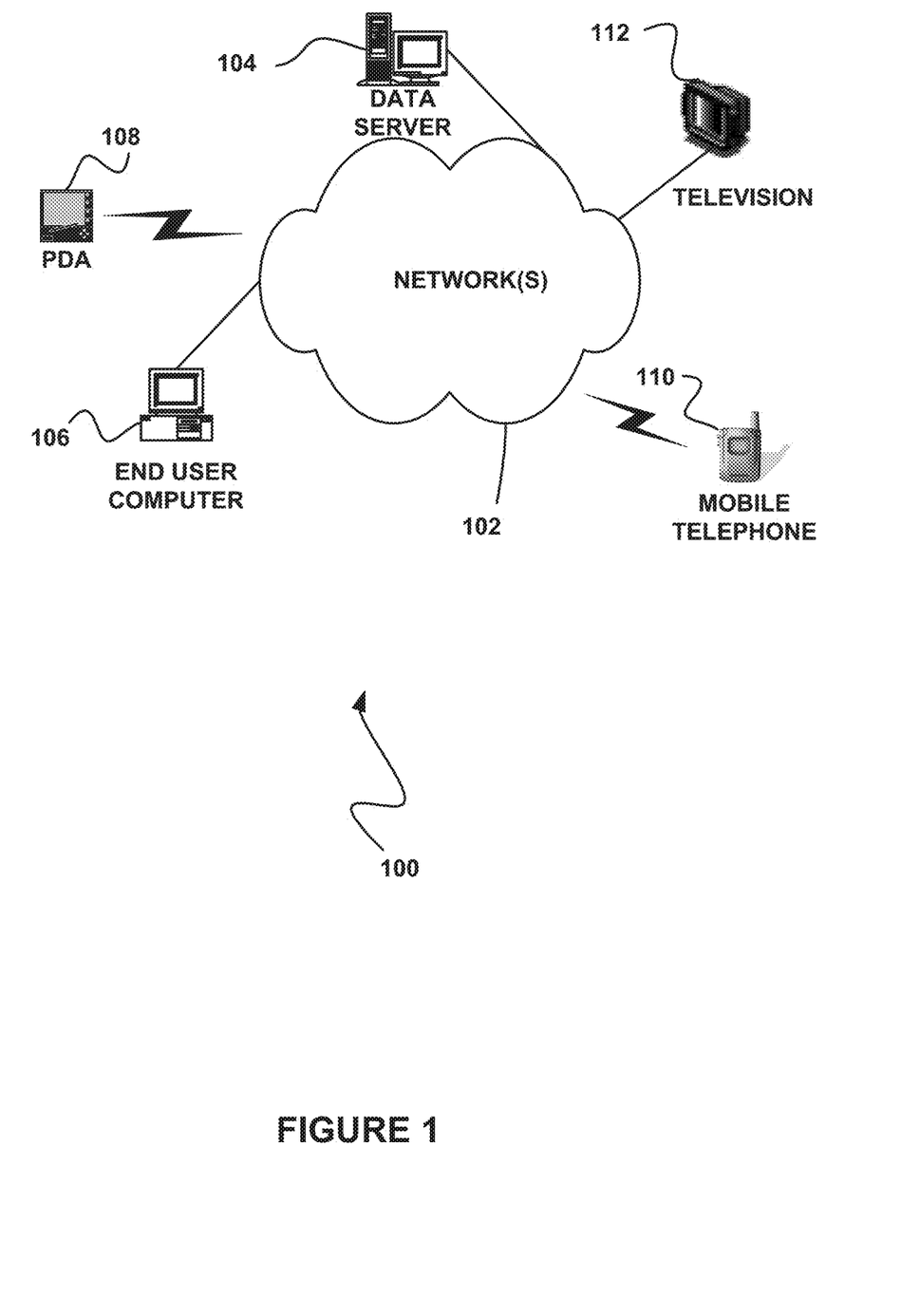
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
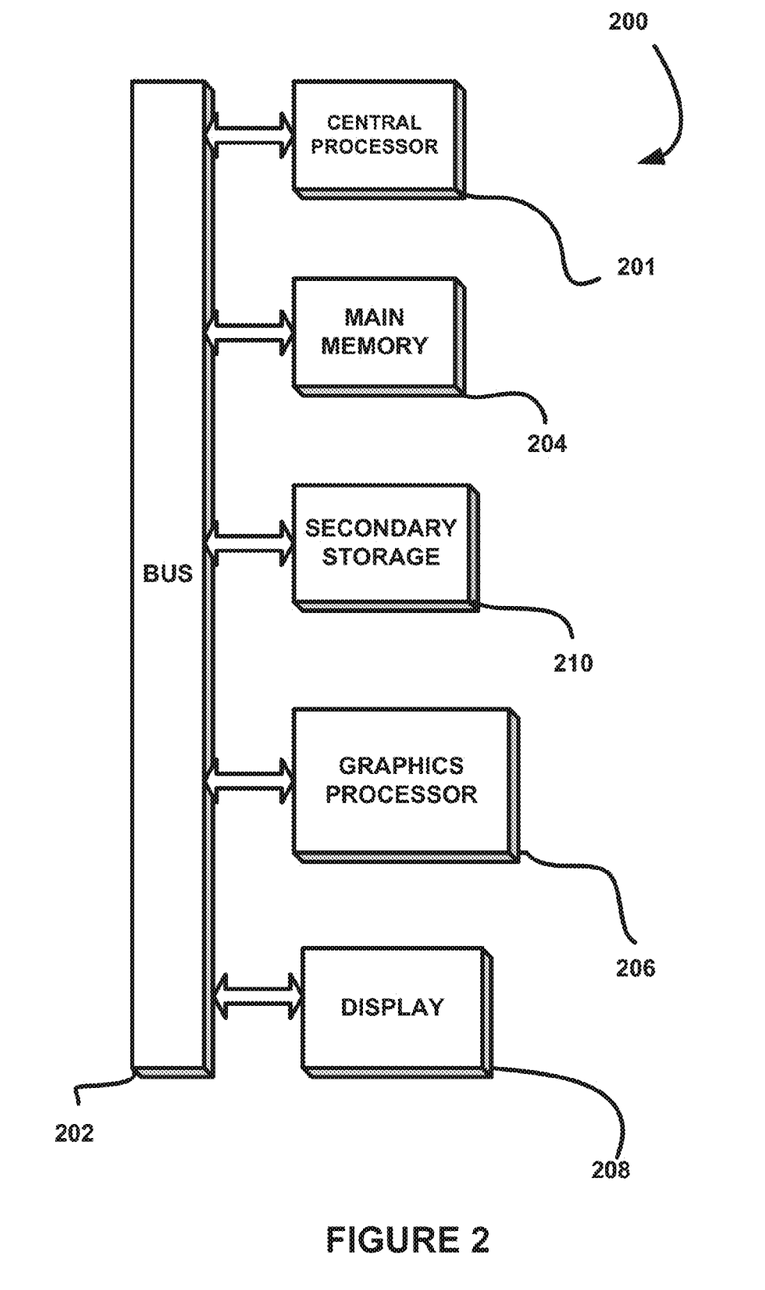
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210, volatile or non-volatile storage, and/or any other type of storage are possible examples of non-transitory computer-readable media.

Figure 3:
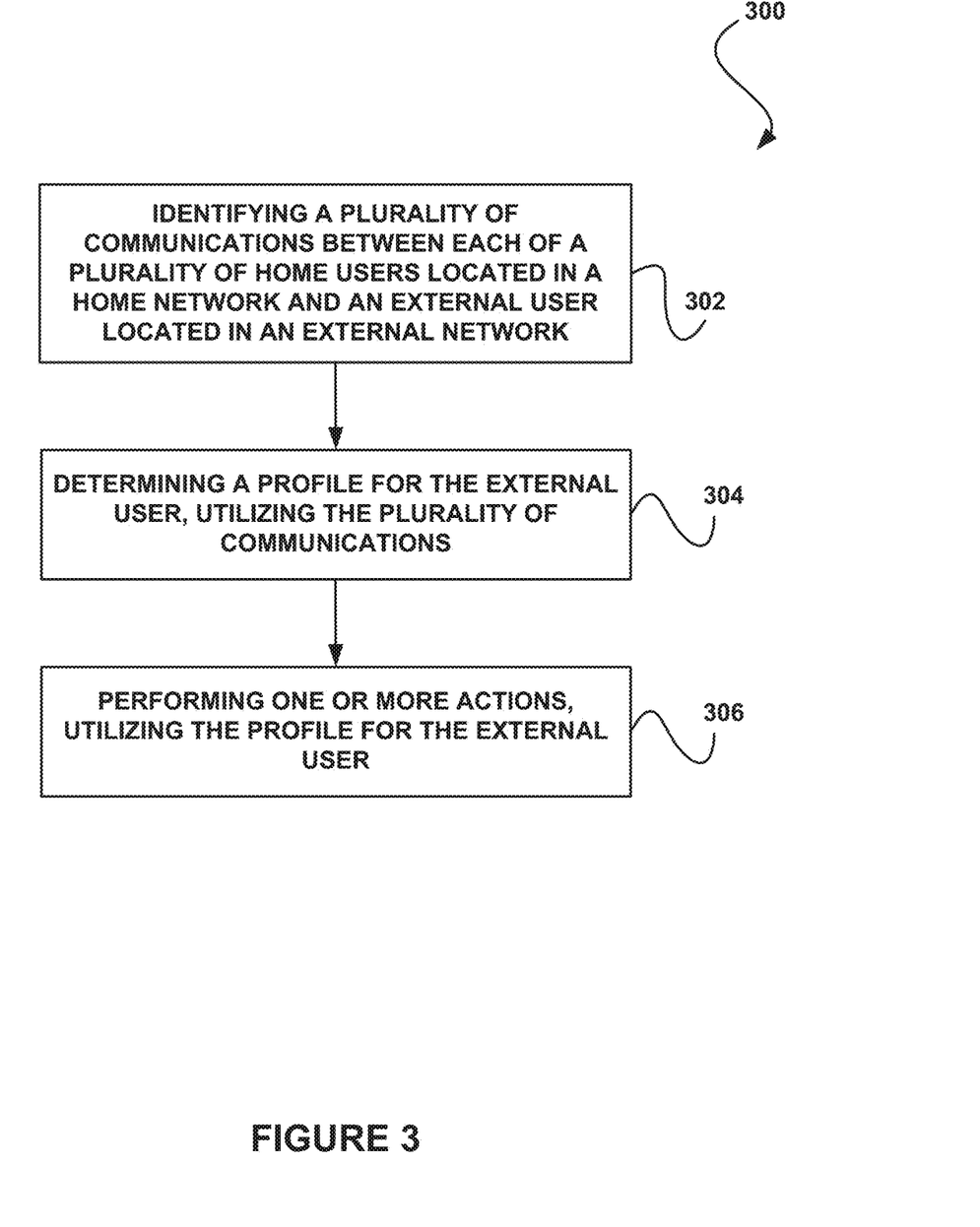
FIG. 3 illustrates a method for determining a profile for an external network user, in accordance with one embodiment.

FIG. 3 illustrates a method 300 for determining a profile for an external network user, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a plurality of communications between each of a plurality of home users located in a home network and an external user located in an external network is identified. In one embodiment, both the home network and the external network may include communication networks. For example, both the home network and the external network may include one or more of cellular communication networks, wireless networks, wired networks, etc.

Additionally, in one embodiment, the external network may include a network that is external to (e.g., separate from, etc.) the home network. In another embodiment, the home network may be run by a first service provider, and the external network may be run by a second service provider separate from the first service provider. In yet another embodiment, the identification of the plurality of communications may be performed by a module associated with the home network (e.g., associated with the service provider of the home network, etc.).

In still another embodiment, the home users may utilize one or more resources of the home network to send and/or receive the plurality of communications. For example, the home users may pay a fee to a service provider of the home network to send and/or receive the plurality of communications. Also, the external user may utilize one or more resources of the external network (and no resources of the home network) to send and/or receive the plurality of communications. For example, the external user may pay a fee to a service provider of the external network (and not a service provider of the home network) to send and/or receive the plurality of communications.

Further, in one embodiment, the plurality of communications may include any communications able to be transmitted between the home users and the external user. For example, the plurality of communications may include cellular communications, phone calls, text messages (e.g., short message service (SMS) messages, multimedia messaging service (MMS) messages, etc.), email messages, internet browsing, etc.). In another embodiment, the plurality of communications may include both incoming and outgoing messages between the home users and the external user. For example, the plurality of communications may include communications initiated by one or more of the home users that are received by the external user, communications initiated by the external user that are received by one or more of the home users, etc.

Also, on one embodiment, the plurality of communications may include communications transmitted between the home users and the external user, utilizing the home network. For example, the plurality of communications may include communications sent between each of the plurality of home users and the external user, where each of the plurality of communications either originate or terminate at the home network. In another embodiment, the plurality of communications may be identified for a predetermined time period.

Further still, in one embodiment, the plurality of communications may be identified by monitoring one or more activities of the plurality of home users. For example, all or a portion of all incoming and outgoing communications involving the plurality of home users may be monitored (e.g., tracked, logged, etc.). In another example, all users associated with all incoming and outgoing communications involving the plurality of home users may be identified and stored. In yet another example, the monitoring may be performed by the provider of the home network. In another embodiment, records of the plurality of communications may be stored in and retrieved from data storage (e.g., a database, a data lake, etc.). In yet another embodiment, the plurality of communications may be extracted from one or more systems (e.g., a business support system (BSS), an operations support system (OSS), etc.).

Also, as shown in operation 304, a profile is determined for the external user, utilizing the plurality of communications. In one embodiment, the profile determined for the external user may include a behavior profile for the user. For example, the profile for the external user may include a summary of the plurality of communications involving the user. In another embodiment, the profile for the external user may include a classification of the external user. For example, the profile for the external user may include a demographic classification of the external user. In yet another embodiment, the profile for the external user may include one or more social connections between one or more of the plurality of home users and the external user.

Additionally, in one embodiment, determining the profile may include analyzing the plurality of communications. For example, determining the profile may include analyzing the plurality of communications to determine one or more connections (e.g., social connections, etc.) between the each of the plurality of home users and the external user. In another embodiment, determining the profile may include analyzing the behavior of the external user.

For example, based on the plurality of communications between each of the plurality of home users and the external user, a behavior of the external user (e.g., a communications history, etc.) may be determined. In another example, the determined behavior of the external user may be compared to behaviors determined for a plurality of home users located on the home network. In yet another example, determining the profile may include determining one or more similarities between the behavior of the external user and the behaviors of the plurality of home users. In still another example, one or more home users that share behavior similarities with the external user may be identified. In another embodiment, these behavior similarities, as well as the identified users that share behavior similarities, may be incorporated into the profile for the external user or may be used to refine the profile for the external user.

Further, in one embodiment, determining the profile for the external user may include constructing a social graph between the external user and each of the home users, based on the plurality of communications. For example, within the social graph, all home users may be represented as nodes within the home network, and links may be made between a node representing the external user and each of the home users that have engaged in communications with the external user. In another embodiment, the social graph may be incorporated into the profile for the external user or may be used to refine the profile for the external user.

Further still, in one embodiment, the social graph between the external user and each of the home users may be augmented, utilizing segmentation data. For example, segmentation data may be used to classify and group each of the home users within the home network. For instance, segmentation data associated with a particular home user may identify one or more elements (e.g., demographics, social factors, economic factors, network usage factors, call patterns, bill payment factors, interests, etc.) associated with the home user. In another example, the segmentation data associated with the plurality of home users that have engaged in communications with the external user may be used to determine segmentation data that is associated with the external user.

In this way, the profile determined for the external user may include a classification of the user that is based on the social graph determined for the external user as well as classifications made for home users within the social graph. In another embodiment, the profile for the external user may be determined utilizing one or more predictive analytics models.

Also, as shown in operation 306, one or more actions are performed, utilizing the profile for the external user. In one embodiment, performing the one or more actions may include determining a future lifetime value for the external user, based on the external user's profile. For example, an amount of time during which the external user may be a member of the home network (and therefore a customer of the home network service provider) may be approximated, utilizing the profile of the external user. In another embodiment, a likelihood of churn may be estimated for the external user, based on the profile for the external user.

In addition, in one embodiment, performing the one or more actions may include determining one or more service plans for service within the home network for the external user, based on one or more of the external user's profile and the future lifetime value associated with the external user. For example, one or more user plans that are optimized for the external user based on their profile may be determined. In another embodiment, performing the one or more actions may include providing one or more offers for service within the home network to the external user by the home user service provider. For example, an offer to subscribe to one or more service plans (e.g., one or more service plans optimized for the user based on the user's profile, etc.) may be sent to the user (e.g., via email, text message, voice telephone call, etc.).

In another embodiment, the one or more offers may include one or more promotions (e.g., coupons, discounts, etc.) that may be selected based on the external user's profile. For example, one or more promotions may be selected to send to the external user if it is determined that such promotions may have a predetermined success rate, based on the external user's profile.

In this way, the service provider of the home network may target the external user with an offer that is specifically tailored to the external user, based on the external user's profile. Additionally, a probability of the external user becoming a customer of the service provider of the home network may be optimized. Further, the external user's profile may be accurately approximated by a service provider of the home network without access to external user information available only to the service provider of the external network.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
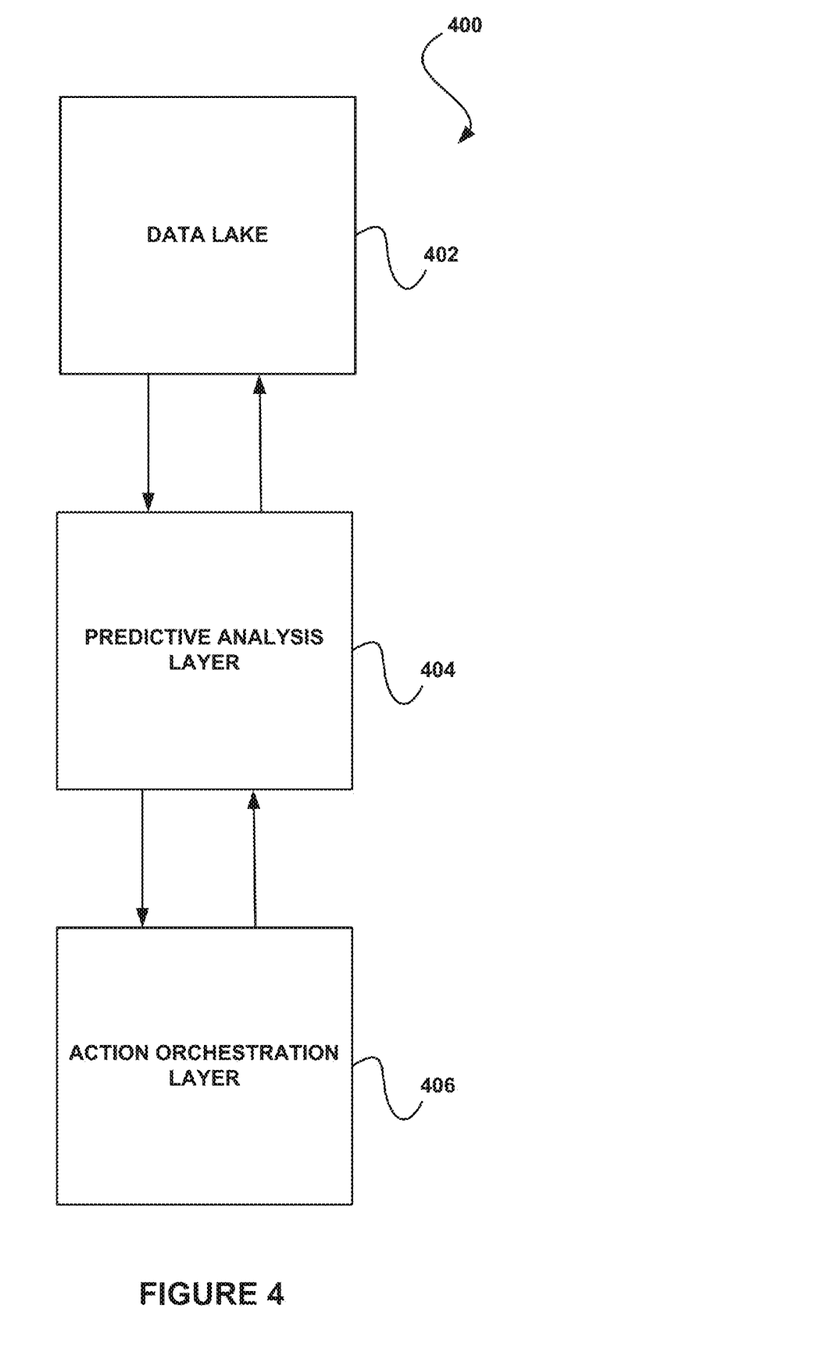
FIG. 4 illustrates a system for determining a user profile, in accordance with one embodiment.

FIG. 4 illustrates a system 400 for determining a user profile, in accordance with one embodiment. As an option, the system 400 may be carried out in the context of the details of FIGS. 1-3. Of course, however, the system 400 may be carried out in any desired environment. Further, the aforementioned definitions may equally apply to the description below.

As shown, the system 400 includes a data lake 402 in communication with a predictive analytics layer 404. Additionally, the system 400 includes an action orchestration layer 406 in communication with the predictive analytics layer 404. In one embodiment, the data lake 402 may include a data repository (e.g., database, etc.) that stores data utilizing one or more high capacity, inexpensive storage devices. In another embodiment, the data lake 402 may utilize an Apache Hadoop framework. For example, the data lake 402 may include an Apache Hadoop based cluster that may utilize a Hadoop filesystem (HDFS) and MapReduce capabilities. In another embodiment, the predictive analytics layer 404 and the action orchestration layer 406 may be included within a business logic component of a service provider of a communications network.

Additionally, in one embodiment, the data lake 402 may store information associated with customers of a communications network. For example, the data lake 402 may receive and store business support system (BSS) and/or operations support system (OSS) information concerning customers of the communications network. More specifically, the data lake 402 may store a communication history for each customer of the communications network, personal information for each customer of the communications network, demographics information for each customer of the communications network, segmentation data associated with each customer of the communications network, etc.

Further, in one embodiment, the data lake 402 may store extracted information. For example, the data lake 402 may store data extracted from a portfolio component of the communications network, where such data may be formatted such that the predictive analytics layer 404 may use the data to build connections and demographics of external users of the communications network.

In another example, the data lake 402 may store identifiers (e.g., phone numbers, etc.) of external users (e.g., users who are not customers of the communications network) who send data to or receive data from customers of the communications network (e.g., by participating in telephone calls, sending and receiving text messages or other data, sending and receiving emails, etc.). Additionally, the data lake 402 may store all instances of communications conducted between the external users and the customers of the communications network.

Further still, in one embodiment, the predictive analytics layer 404 may include one or more software elements. For example, the predictive analytics layer 404 may include a GNU R and/or Apache Mahout free open source software (FOSS) based software layer or other analytics framework. In another embodiment, the predictive analytics layer 404 may retrieve and perform one or more actions on information stored within the data lake 402.

For example, the predictive analytics layer 404 may retrieve all communications conducted within the communications network for a predetermined period of time, and may extract an identifier of an external user as well as all instances of communications associated with that external user and customers of the communications network taking place over the predetermined period of time. Additionally, the predictive analytics layer 404 may construct a social graph between the external user and the customers of the communications network, based on the extracted information. Further, the predictive analytics layer 404 may augment the social graph with segmentation data for each of the customers of the communications network.

Also, in one embodiment, the predictive analytics layer 404 may classify the external user, based on the extracted information and constructed social graph. For example, the predictive analytics layer 404 may use one or more algorithms (e.g., support vector machines, etc.) to classify the external user. In another embodiment, the predictive analytics layer 404 may estimate a future lifetime value for the external user, assuming the external user becomes a customer of the communications network.

In addition, in one embodiment, the action orchestration layer 406 may request and receive the classification of the external user from the predictive analytics layer 404 and may perform one or more actions based on the classification. For example, the action orchestration layer 406 may provide the means to acquire the external user based on personalized incentives (e.g., coupons, advertisements, tailored service plans, etc.) derived from the classification of the external user.

In this way, data collected by various systems of the communications network provider (e.g., OSS systems, BSS systems, etc.) and stored in the data lake 402 may be used by the predictive analytics layer 404 to find and build social connections for an external user as well as to determine a demographic classification for the external user, where the external user is not a customer of the communications network and does not use the external network to send or receive communications to customers of the communications network.

Figure 5:
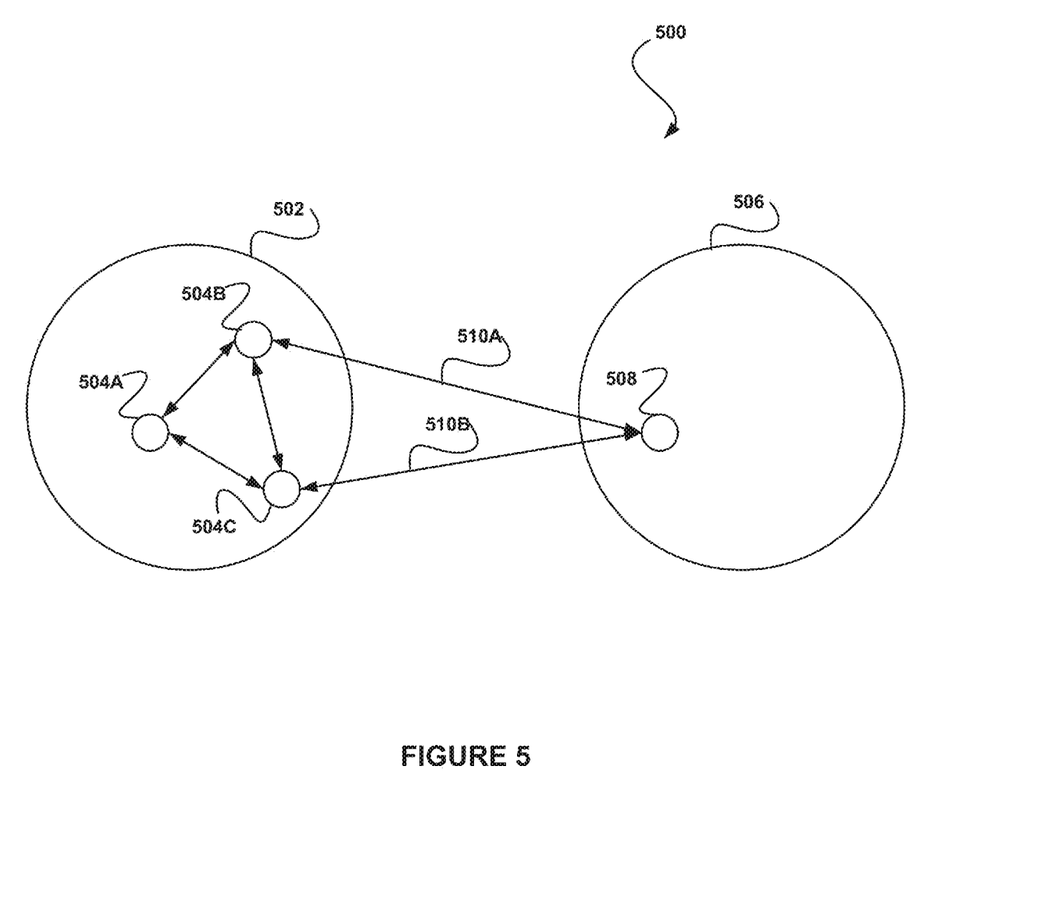
FIG. 5 illustrates an exemplary social graph for performing user classification, in accordance with one embodiment.

FIG. 5 illustrates an exemplary social graph 500 for performing user classification, in accordance with one embodiment. As an option, the exemplary social graph 500 may be carried out in the context of the details of FIGS. 1-4. Of course, however, the exemplary social graph 500 may be carried out in any desired environment. Further, the aforementioned definitions may equally apply to the description below.

As shown, the exemplary social graph 500 includes a home network 502 including home users 504A-C, as well as an external network 506 that includes an external user 508. In one embodiment, the home users 504A-C may include customers of the home network 502 that pay for telecommunications services provided by a service provider of the home network 502. In another embodiment, the external user 508 may include a customer of the external network 506 that pays for telecommunications services provided by a service provider of the external network 506, and does not pay for or use telecommunications services provided by a service provider of the home network 502.

Additionally, the social graph 500 includes an indication of communications 510A-B between the home users 504A-C and the external user 508. In one embodiment, the communications 510A-B may include all communications between the home users 504A-C and the external user 508 that have been tracked by the service provider of the home network 502 for a predetermined time period. In another embodiment, one or more of the home users 504A-C may initiate one or more of the communications 510A-B, and the external user 508 may receive such communications 510A-B. In yet another embodiment, the external user 508 may initiate one or more of the communications 510A-B, and one or more of the home users 504A-C may receive such communications 510A-B.

Further, in one embodiment, each of the home users 504A-C within the home network 502 may be segmented based on one or more criteria. For example, each of the home users 504A-C may be characterized by the service provider of the home network 502 based on data stored for each of the home users 504A-C by the service provider of the home network 502. In another embodiment, examples of such characterization may include age, geographic location, income, occupation, bill paying history, etc.

Further still, in one embodiment, the external user 508 may be segmented based on the communications 510A-B between the home users 504A-C and the external user 508. For example, the external user 508 may be noted by the service provider of the home network 502 as having one or more characteristics shared by each of the home users 504A-C that have communicated with the external user 508. For instance, if the social graph 500 indicates that the home users 504A-C engaging in communications 510A-B with the external user 508 have a predetermined characteristic, then the external user 508 may be assigned that characteristic.

In another embodiment, one or more characteristics shared by each of the home users 504A-C that have communicated with the external user 508 may be weighted, based on a number of communications between each of the home users 504A-C and the external user 508. For example, if a high number of communications are noted between the external user 508 and home users 504A-C having a certain characteristic, the characteristic may be assigned to the external user 508, and a high weight may be associated with the characteristic.

In this way, the external user 508 may be segmented by the service provider of the home network 502, even though the external user 508 is not a customer of the home network 502. Additionally, the service provider of the home network 502 may provide one or more offers (e.g., subscription offers, plan offers, etc.) tailored to the external user 508 based on the communications 510A-B between the home users 504A-C and the external user 508 and the segmenting of the external user 508.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising computer code for:
   identifying, by a system including a hardware processor, a home communications network that is run by a first service provider and an external communications network separate from the home communications network that is run by a second service provider;
   monitoring by the system a plurality of communications between each of a plurality of home users located in the home communications network and an external user located in the external second communications network, where each of the plurality of communications either originate or terminate in the first communications network;
   determining by the system a profile for the external user, utilizing the plurality of communications, including:
     constructing a social graph containing an external user node representing the external user and home user nodes representing each of the home users, where links between the external user node and the home user nodes represent the plurality of communications,
     adding segmentation data to each of the home user nodes, the segmentation data including one or more network usage factors, call patterns, bill payment factors, and interests associated with the home user associated with each of the home user nodes, and
     determining segmentation data for the external user node utilizing a predictive analytics model and the segmentation data added to each of the home user nodes; and
   performing one or more actions by the system, utilizing the profile for the external user, including determining a service plan for the external user utilizing the home communications network, where the service plan is optimized for the external user utilizing the profile for the external user.

2. The computer program of claim 1, wherein records of the plurality of communications are stored in and retrieved from data storage.

3. The computer program of claim 1, wherein the profile determined for the external user includes a behavior profile for the user.

4. The computer program of claim 1, wherein the profile for the external user includes a demographic classification of the external user.

5. The computer program of claim 1, wherein the profile for the external user includes one or more social connections between one or more of the plurality of home users and the external user.

6. The computer program of claim 1, wherein determining the profile includes analyzing the plurality of communications to determine one or more connections between the each of the plurality of home users and the external user.

7. The computer program of claim 1, wherein determining the profile includes determining one or more similarities between a behavior of the external user and behaviors of the plurality of home users.

8. The computer program of claim 1, wherein performing the one or more actions includes determining a future lifetime value for the external user, based on the external user's profile.

9. The computer program of claim 1, wherein performing the one or more actions includes providing one or more offers for service within the home network to the external user by the home user service provider.

10. A method, comprising:
   identifying, by a system including a hardware processor, a home communications network that is run by a first service provider and an external communications network separate from the home communications network that is run by a second service provider;

monitoring by the system a plurality of communications between each of a plurality of home users located in the home communications network and an external user located in the external second communications network, where each of the plurality of communications either originate or terminate in the first communications network;

determining by the system a profile for the external user, utilizing the plurality of communications, including:

constructing a social graph containing an external user node representing the external user and home user nodes representing each of the home users, where links between the external user node and the home user nodes represent the plurality of communications, adding segmentation data to each of the home user nodes, the segmentation data including one or more network usage factors, call patterns, bill payment factors, and interests associated with the home user associated with each of the home user nodes, and determining segmentation data for the external user node utilizing a predictive analytics model and the segmentation data added to each of the home user nodes; and performing one or more actions by the system, utilizing the profile for the external user, including determining a service plan for the external user utilizing the home communications network, where the service plan is optimized for the external user utilizing the profile for the external user.

11. A system, comprising:

a processor for:

identifying, by the system, a home communications network that is run by a first service provider and an external communications network separate from the home communications network that is run by a second service provider;

monitoring by the system a plurality of communications between each of a plurality of home users located in the home communications network and an external user located in the external second communications network, where each of the plurality of communications either originate or terminate in the first communications network;

determining by the system a profile for the external user, utilizing the plurality of communications, including:

constructing a social graph containing an external user node representing the external user and home user nodes representing each of the home users, where links between the external user node and the home user nodes represent the plurality of communications, adding segmentation data to each of the home user nodes, the segmentation data including one or more network usage factors, call patterns, bill payment factors, and interests associated with the home user associated with each of the home user nodes, and determining segmentation data for the external user node utilizing a predictive analytics model and the segmentation data added to each of the home user nodes; and performing one or more actions by the system, utilizing the profile for the external user, including determining a service plan for the external user utilizing the home communications network, where the service plan is optimized for the external user utilizing the profile for the external user.

12. The system of claim 11, wherein the processor is coupled to memory via a bus.

* * * * *